US007363459B2

(12) United States Patent
Schreiber et al.

(10) Patent No.: US 7,363,459 B2
(45) Date of Patent: Apr. 22, 2008

(54) SYSTEM AND METHOD OF OPTIMIZING MEMORY USAGE WITH DATA LIFETIMES

(75) Inventors: Robert S. Schreiber, Palo Alto, CA (US); Alain Darte, Lyons (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 297 days.

(21) Appl. No.: 10/284,844

(22) Filed: Oct. 31, 2002

(65) Prior Publication Data

US 2004/0088515 A1    May 6, 2004

(51) Int. Cl.
*G06F 12/00* (2006.01)
(52) U.S. Cl. .................. 711/202; 711/150; 711/170
(58) Field of Classification Search ............. 711/202, 711/120, 150; 717/151, 152, 159, 160
See application file for complete search history.

(56) References Cited

U.S. PATENT DOCUMENTS

| 4,991,088 | A   |   | 2/1991  | Kam             |         |
|-----------|-----|---|---------|-----------------|---------|
| 5,764,951 | A   |   | 6/1998  | Ly et al.       |         |
| 6,078,745 | A   | * | 6/2000  | De Greef et al. | 717/151 |
| 6,298,071 | B1  |   | 10/2001 | Taylor et al.   |         |
| 6,374,403 | B1  |   | 4/2002  | Darte et al.    |         |
| 6,438,747 | B1  |   | 8/2002  | Schreiber et al.|         |
| 2004/0034754 | A1 |  | 2/2004  | Schreiber       |         |
| 2004/0088515 | A1 |  | 5/2004  | Schreiber et al.|         |
| 2004/0088520 | A1 |  | 5/2004  | Gupta et al.    |         |

OTHER PUBLICATIONS

U.S. Appl. No. 10/223,224, Schreiber.
U.S. Appl. No. 10/284,932, Schreiber, et al.
U.S. Appl. No. 10/284,965, Gupta, et al.
R. Schreiber, et al. "PICO-NPA: High-Level Synthesis of Nonprogrammable Hardware Accelerators," Journal of VLSI Signal Processing, to appear.Hewlett-Packard Laboratories, Palo Alto, California 94304-1126, pp. 1-22.
J. Steensma, et al., "Symbolic Macro Test for DSP Systems Applied to a Voice Coder Application," pp. 215-223.
Christine Eisenbeis, et al., "A Strategy for Array Management in Local Memory," (Jul. 1990), pp. 1-40.
A. Agarwal, et al., "Automatic Partitioning of Parallel Loops and Data Arrays for Distributed Shared Memory Multiprocessors," pp. 1-41.
J. Rosseel, et al., "An Optimisation Methodology for Array Mapping of Affine Recurrence Equations in Video and Image Processing," IEEE, pp. 415-426 (1994).
S. Malik, "Analysis of Cyclic Combinational Circuits," Short Papers IEEE Transactions on Computer-aided Design of Integrated Circuits and Systems, vol. 13, No. 7, (Jul. 1994) pp. 950-956.
A. Srinivasan, et al. "Practical Analysis of Cyclic Combinational Circuits," IEEE 1996 Custom Integrated Circuits Conference, pp. 381-384.

(Continued)

*Primary Examiner*—Jack Lane (57) ABSTRACT

A method of storing data includes the steps of storing data comprising the steps of identifying respective lifetimes of each member of an indexed collection of data elements, each of the data elements referenceable in a data index space representing a set of valid data element indices; identifying a set of pairs of the data elements having overlapping lifetimes; and generating a mapping from the data index space to an address offset space based on the set of pairs of the data elements having the overlapping lifetimes.

24 Claims, 4 Drawing Sheets

OTHER PUBLICATIONS

Guest Editorial, IEEE Transactions on Computer-aided Design of Integrated Circuits and Systems, vol. 18, No. 1, (Jan. 1999) pp. 1-2.

K. Danckaert, et al. "Strategy for Power-Efficient Design of Parallel Systems," IEEE Transactions on Very Large Scale Integration (VLSI) Systems, vol. 7, No. 2, (Jun. 1999) pp. 258-265.

F. Vermeulen, et al., "Extended Design Reuse Trade-Offs in Hardware-Software Architecture Mapping," (2000) pp. 103-107.

R. Schreiber, et al., "High-Level Synthesis of Nonprogrammable Hardware Accelerators," IEEE (2000) pp. 1-12.

S. Mahlke, et al., "Bitwidth Cognizant Architecture Synthesis of Custom Hardware Accelerators," IEEE Transactions on Computer-Aided Design of Integrated Circuits and Systems, vol. 20, No. 11, (Nov. 2001) pp. 1355-1371.

P. R. Panda, et al., "Data and Memory Optimization Techniques for Embedded Systems," ACM Transactions on Design Automation of Electronic Systems, vol. 6, No. 2, (Apr. 2001) pp. 149-206.

S. Meftali, et al., "An Optimal Memory Allocation for Application-Specific Multiprocessor System-on-Chip," (2001) pp. 19-24.

T. Van Achteren, et al., "Data Reuse Exploration Techniques for Loop-dominated Applications," Proceedings of the 2002 Design, Automation and Test in Europe Conference and Exhibition, IEEE Computer Society, (Jan. 2002).

"Omega Project Source Release, version 1.2 (Aug. 2002)," [on-line] [retrieved on : Jul. 16, 2002], Retrieved from: http://www.cs.umd.edu/projects/omega/release-1.2.html, pp. 1-2.

Seeds for Tomorrow's World—IMECnology, [on-line] [Retrieved on Jun. 12, 2002] Retrived from: http://www.Imec.be/.

G. Havas, et al. "Extended GCD and Hermite Normal Form Algorithms Via Lattice Basis Reduction," Experimental Mathmatics, v. 7 (1998).

Eddy De Greef, Francky Catthoor, and Hugo De Man, Memory Size Reduction Through Storage Order Optimization for Embedded Parallel Multimedia Applications, Parallel Computing, 1997, 23(12):1811-1837, North-Holland, Amsterdam, Netherlands.

Fabien, Quilleré and Sanjay Rajopadhye, Optimizing Memory Usage in the Polyhedral Model, ACM Transactions on Programming Languages and Systems, 2000, 22(5)773-815, ACM Press, New York.

Vincent Lefebvre and Paul Feautrier, Automatic Storage Management for Parallel Programs, Parallel Computing, 1998, 24(3-4): 649-671, North-Holland, Amsterdam, Netherlands.

Alain Darte, Robert Schreiber, and Gilles Villard, Lattice-Based Memory Allocation, Proceedings of the 2003 International Conference on Compilers, Architectures, and Synthesis for Embedded Systems, pp. 298-308, Oct. 2003, ACM PRESS, New York.

Panda, P R et al—"Efficient Utilization of Scratch-Pad Memory in Embedded Processor Applications"—Mar. 17, 1007—pp. 7-11.

Kandemir, M et al—"Compiler-Directed Selection of Dynamic Memory Layouts"—Apr. 25, 2001—pp. 219-224.

Grun, P et al—"APEX: Access Pattern Based Memory Architecture Exploration"—Sep. 30, 2001—pp. 25-32.

Catthoor, F et al—"Hot Topic Session: How to Solve the Current Memory Access and Data Transfer Bottlenecks . . . "—Mar. 27, 2000—pp. 426-433.

Kandemir, M et al—Exploiting Scratch-Pad Memory Using Presburger Formulas—Sep. 30, 2001—pp. 7-12.

McFarland, MC et al—"The Hogh-Level Synthesis of Digital Systems"—Proc of the IEEE vol. 78 No. 1—Feb. 1, 1990—pp. 301-318.

Park, N et al—Sehwa: A Software Package for Synthesis of Pipelines From Behavioral Specifications—IEEE Transactions vol. 7 No. 3—Mar. 1998—pp. 356-370.

* cited by examiner

```
int y[10][10];
void proc()
{
   int x[10][10];
   int z[10][10];
   // Loop Nest Number 1
   for (i=0; i<10; i++)
     for (j=0; j<10; j++)
       x[i][j]=i+j;

// Loop Nest Number 2
   for(i=1; i<10; i++)
     for (j=1; j<10; j++){
       z[i][j]=x[i][j];
       y[i][j]=z[i][j]+z[i-1][j]+z[i][j-1];
     }
}
```

SYSTEM AND METHOD OF OPTIMIZING MEMORY USAGE WITH DATA LIFETIMES

CROSS-REFERENCE TO RELATED APPLICATIONS

This application is related to concurrently filed, co-pending patent application Ser. No. 10/284,932, entitled "Method and System for the Design of Pipelines of Processors" and filed Oct. 31, 2002, the disclosure of which is hereby incorporated by reference herein.

FIELD OF THE INVENTION

The present invention relates generally to data processing and, more particularly, to optimizing memory usage with data lifetimes.

DESCRIPTION OF RELATED ART

A conventional computer architecture typically includes a Central Processing Unit (CPU) connected to a main memory system and various input/output (I/O) facilities. Data including instructions moves between the main memory and the CPU. The overall bandwidth between main memory and the CPU is limited by a number of factors including memory access time, word size, bus width and speed, etc. In most cases, particularly those cases involving a large amount of data (e.g., scientific computer applications and/or image/video processing) the memory bandwidth between the CPU and main memory creates a bottleneck and may reduce overall system performance to an unacceptable or undesirable level.

Various memory systems have been devised to satisfy storage requirements of both typical general-purpose computer systems and specialized devices (e.g., personal digital assistants, and dedicated devices such as digital cameras, entertainment devices, programmable test equipment, computer controlled manufacturing equipment, etc.). While the cost of memory has continued to decrease while capabilities have continued to increase, a corollary expands the requirement for such memory resources at a similarly ever-expanding rate. Thus, there is an ever-expanding need for techniques, methods, and systems for efficiently deploying and using memory resources. Such memory resources may include but are not limited to main memory, various levels of cache, scratch pad memory (SPM), etc.

For example, typical computer systems use a hierarchical memory structure of a limited number of very high speed registers directly accessible by the various structures comprising a processor, a larger but somewhat slower array of on-chip level 1 cache memory possible augmented by a larger amount of off-chip level 2 cache, followed by a still slower yet more plentiful main memory, etc. Thus, to reduce potential bottlenecks between main memory and the CPU, computer designers may use a multi-level memory hierarchy, such as a memory hierarchy that includes the use of main memory as well as one or more levels of intermediate cache memory. A cache memory decreases the time needed by a CPU to access data, thereby minimizing data latency. As a result, the cache memory improves performance of the executing application.

Cache memory in these systems is generally not directly available to the programmer. That is, cache memory is generally not part of the application program interface but is instead controlled by a dedicated controller or similar hardware. A compiler that compiles programs and the program performing the "load" and "store" commands into main memory makes use of the cache memory without receiving requests from the programmer. In addition at runtime, hardware may automatically transfer frequently addressed data and/or instructions associated with a range of addresses in main memory to the cache. CPU requests for the data stored in those addresses are automatically fulfilled from the cache.

Systems that require high performance hardware, such as digital signal processors and custom computer engines, require high memory bandwidth to support their high speed computations. The standard cache arrangement as explained above does not provide enough memory bandwidth for these types of systems and, even though cache may be used to supplement main memory, bottlenecks still ultimately occur. To provide additional local memory bandwidth so that bottlenecks do not or are less likely to occur, in addition to cache memory, computer designers may include small, fast local memory called Scratch Pad Memory (SPM) in their computer design. SPM is local memory that is available for use by a programmer and through an application program interface. For example, a program's "load" and "store" instructions may explicitly address either main memory area or a particular local SPM area. The program explicitly places a given data item in one of these separate memory spaces. An SPM may provide data directly to the CPU without using main memory bandwidth or space within cache memory. SPM, therefore, further improves system performance and decreases the time required for a CPU to access data. As a result, the SPM improves performance of the executing application.

Currently, data is relocated to SPM by a computer programmer and is not inserted automatically by the compiler at program compile time. It is therefore desirable to automatically configure SPM usage and make the most efficient use of SPM.

In addition to SPM, the use of other memory resources should be optimized to provide and support efficient data and information processing.

For some applications that require high performance, dedicated hardware processors may be constructed. A software function that is expressed as a nested loop may be implemented in hardware by a dedicated processor or array of processing elements. A more complex software function, which may be expressed by a program fragment consisting of a sequence of nested loops, may be implemented by a pipeline of arrays of one or more processing elements. In designing such a pipeline, the designer may choose a schedule that determines the exact clock cycle, relative to the start of the first stage of the pipeline, at which every computational operation is performed. These operations may include loads and stores to memory. Such designs have been traditionally created manually.

BRIEF SUMMARY OF THE INVENTION

According to one aspect of the invention, a method of storing data comprises the steps of identifying respective lifetimes of each member of an indexed collection of data elements, each of the data elements referenceable in a data index space representing a set of valid data element indices; identifying a set of pairs of the data elements having overlapping lifetimes; and generating a mapping from the data index space to an address offset space based on the set of pairs of the data elements having the overlapping lifetimes.

According to another aspect of the invention, a method of storing data comprises the steps of identifying an array data structure in a program; for each element of the array data structure, identifying an earliest write time and a last read time; finding a representation of a set of pairs of the elements having overlapping lifetimes; finding a set of differences of indices of the sets of pairs of the elements having the overlapping lifetimes; finding an integer lattice with no non-zero vector point in common with the set of differences; and mapping from a data index space of the array data structure to an address offset space using the integer lattice.

According to still another aspect of the invention, a computer program stored in a computer readable medium, the computer program comprising computer executable code for: identifying respective lifetimes of each member of an indexed collection of data elements, each of the data elements referenceable in a data index space representing a set of valid data element indices; identifying a set of pairs of the data elements having overlapping lifetimes; and generating a mapping from the data index space to an address offset space based on the set of pairs of the data elements having the overlapping lifetimes.

According to still another aspect of the invention, a computer program stored in a computer readable medium, the computer program comprising computer executable code for: identifying an array data structure in a program; for each element of the array data structure, identifying an earliest write time and a last read time; finding a representation of a set of pairs of the elements having overlapping lifetimes; finding a set of differences of indices of the sets of pairs of the elements having the overlapping lifetimes; finding an integer lattice with no non-zero vector point in common with the set of differences; and mapping from a data index space of the array data structure to an address offset space using the integer lattice.

DETAILED DESCRIPTION

The invention implements an alternative method and structure for storing data, such as otherwise stored in single and multidimensional data arrays, in which each element of the array is assigned a unique location in memory. However, unlike conventional data arrays, two or more array elements may share a memory location; the number of storage locations consumed by the array is less than the number of elements of the array. Further, embodiments of the invention do not require that a mapping from array indices (i, j) to a position in a linear address space be computed as the sum of a base address of the array and a linear function that specifies the offset into the array, i.e., use linear-offset mapping (LOM).

Instead, embodiments of the invention may include processing to identify particular "live" elements of data that may be stored in a data structure (e.g., an array) and generate suitable object code to make such required data available in a readily accessible venue or buffer, such as a main memory, cache or scratch pad memory (SPM). Data, such as an element of an array, may be considered "live" at some point in time if it is or stores a value that will be read at some later time. Thus, in embodiments of the invention, the number of memory locations consumed by an array can be much smaller than the number of array elements. Thus, multiple array elements may be mapped to the same memory word. To implement a time-shared usage of memory, a schedule of the computation and a mapping of array elements to memory locations may be formulated so that any two array elements are not placed in the same memory location if the two array elements are simultaneously live. Sharing of physical memory provides for the use of a smaller hardware memory for storing program data, thereby reducing the hardware cost. It further provides for more efficient use of memory including cache and SPM, both of which are typically limited in size.

An embodiment of the present invention is particularly applicable to those applications that require high performance especially using a pipeline of dedicated hardware processors. An automatic design tool for hardware pipelines attempts to achieve a required performance level with minimum hardware cost. In order to minimize the hardware cost, it should make efficient use of buffer and scratchpad memories. An embodiment of the present invention provides a method thorough which an automatic design tool may reduce the amount of hardware memory and registers needed to achieve a given performance level in an implementation in hardware of a processor or pipeline of processors. The related simultaneously filed U.S. patent application Ser. No. 10/284,932 entitled "Method And System For The Design Of Pipelines Of Processors" describes a processor pipeline design method that may use the buffer memory minimization method of the present invention.

Figure 1:
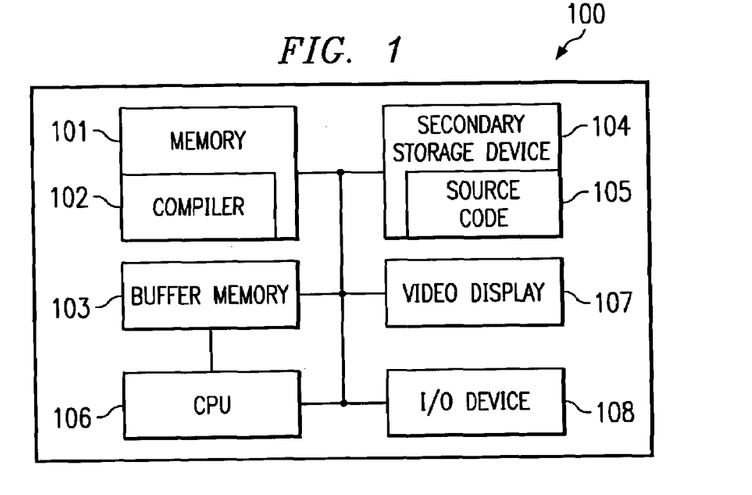
FIG. 1 is a block diagram of a computer system consistent with one embodiment of the present invention.

FIG. 1 depicts a detailed view of computer 100 compatible with an embodiment of the invention, including main memory 101, Buffer Memory 103 (e.g., cache, SPM, etc.), secondary storage device 104, Central Processing Unit (CPU) 106, video display 107 and input/output device 108 connected by system bus. Main memory 101 stores compiler 102. Compiler 102 may operate on source code 105 stored in secondary storage device 104 to produce executable object code. For simplicity it is assumed that related functions including, for example, linking and loading, are performed as necessary to provide an executable object module. Thus, memory allocation, including SPM, may be performed by a combination of software and other systems including, but not limited to, a compiler, linker, loader, specialized utility, etc.

An example of a compiler suitable for use with methods and systems consistent with an embodiment of the present invention is any generic C compiler. An example of an architecture synthesis program suitable for use with the methods and systems consistent with an embodiment of the present invention is the HP Labs PICO system, which could use the techniques to minimize the amount of memory hardware needed to implement a given function. The compiler may provide functionality according to the present invention to automatically generate appropriate object code (including object code file(s) and/or object module(s) and load modules) enabling intelligent, e.g., time-shared, use of memory. By minimizing the amount of main memory required to store an array the compiler reaps additional benefits because the amount of cache required is also reduced. Secondary storage device 104 may contain source code 105. Source code 105 may be a program written in a high level language, such as the C programming language. Source code 105 contains loop nests, and data arrays are accessed (read and written) within (i.e., in response to instructions included within) those loop nests.

Secondary storage device 104 may further store object modules including library modules and executable modules or portions thereof, particularly when a paging mode of operation is used for execution of a large program.

An example of a compiler suitable for use with methods and systems consistent with the present invention may include functionality to analyze a program, typically in the form of source code instructions, to identify storage structures such as arrays, used to store data. The compiler may then operate to determine subsets of simultaneously live elements, and remap the data into a time-shared memory address space.

Figure 2A:
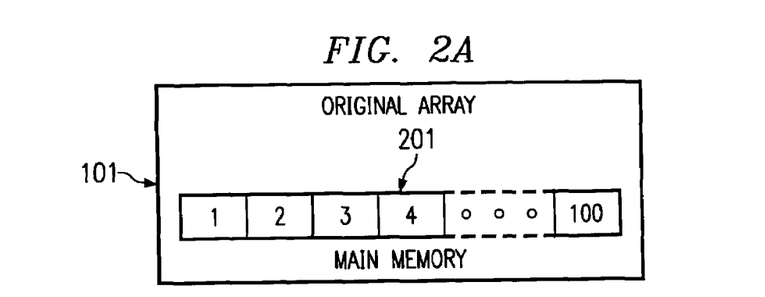
FIGS. 2A and 2B show a more detailed diagram of main memory and a buffer in the form Scratch Pad Memory (SPM) memory shown in FIG. 1.
Figure 2B:
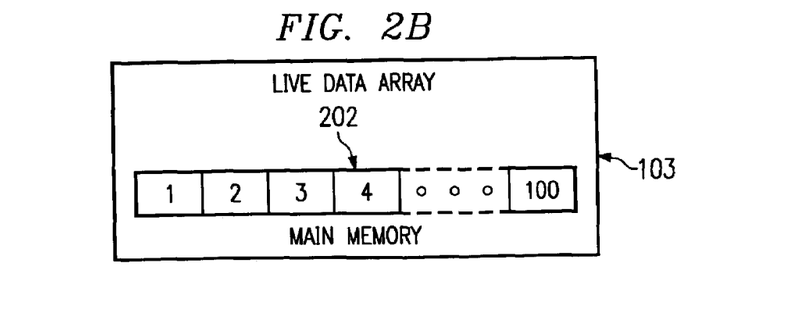

FIGS. 2A and 2B depict a more detailed view of a data map depicting locations of data structures stored in main memory 101 and Buffer Memory 103. Main memory 101 may contain original array 201 including all elements to be processed by CPU 106. Original array 201 at any particular processor or event time includes both live and dormant elements. Buffer Memory 103 may contain a host array 202, ideally, including a subset of elements from original array 201 to be processed by CPU, such as only those live elements in original array 201 that are actually predicted to be accessed by a certain loop nest during any particular period of program execution or time (i.e., assuming normal entry to and exit from the loop nest).

According to one embodiment of the invention, a function provides a time dependent mapping from the larger address space used to access elements of original array 201 to a smaller, time-shared address space storing, in host array 202, a subset of elements, including live elements of original array 201 to be accessed while excluding or minimizing the number of elements not to be used during such period, i.e., dormant elements of original array 201.

As explained, elements in host array 202 may be processed more rapidly than those elements in original array 201, since CPU 106 may directly access Buffer Memory 103 without interfacing with main memory 101 or contending for access to shared system bus facilities. The host array in Buffer Memory 103 is made as small as possible by selecting a suitable choice of a time-dependent mapping from the original array indices to the host array indices. Elements may also be moved from original array 201 to host array 202, such that the compiler may use (i.e., produce an object module referring to) elements from Buffer Memory 103 instead of main memory 101. After CPU 106 processes the elements in any given segment of code, e.g., loop nesting, the elements may be moved back to main memory 101. The compiler generates the appropriate code as part of, for example, the object module, to perform the appropriate data transfers and moves between main memory 101 and Buffer Memory 103.

As an example, consider a single, n-dimensional array in a C program. Each element of the array may have a precisely known lifetime, i.e., a first time or event when data is first stored therein by a program instruction and a final time the data is accessed by an instruction. (Note that the terms first and final are used in connection with a particular segment of code under consideration. Thus, the life of a particular data element is determined with respect to storage requirements for a particular set of instructions that may be less than an entire program.)

In some cases, it may not be possible to know, at compile time or hardware synthesis time, the set of all runtime read and write accesses to each of a set of data elements such as the elements of an array. This uncertainty may be due, for example, to data-dependent branching, or to the use of a dynamically determined schedule for a set of computations, or for some other reason. It may however be possible, even in such a situation, to ascertain, for each data element, an earliest possible write time and a latest possible read time. These two times provide an upper and a lower bound on the lifetime of said data element. An embodiment of the present invention may use the potential lifetime (that is known at compile time) of each data element which period or interval is known to include its actual lifetimes.

Knowing the clock cycles at which an element is read and written, it is possible to compute the intervals of time in which a given element is "full" and holds a meaningful value, and the times in which it is empty and the program's behavior does not depend in any way on what value this element holds. (Note that the term "time" is used herein in its broadest sense to encompass real, machine and other temporal arrangements of events associated with processing and memory usage.) Once determined, mapping from array index "a" into physical memory location "addr" may be defined in the following form:

Modulo-offset mappings (MOM): addr=base_adress+offset;

Offset computation: offset=$M_1(M_2$ a mod r).

In an MOM, "a" is the n-dimensional integer vector of array indices. The parameters of the mapping are: the 1×m integer matrix $M_1$, the m×n integer matrix $M_2$, and the m-element column vector $r=(r_1, \ldots, r_m)^T$. (The superscript T denotes matrix transpose; we do not distinguish between a column vector and an n×1 matrix, nor do we distinguish between a row vector and a 1×n matrix.)

If an MOM is used, the mod operation is performed on the elements of the vector ($M_2$ a) using the corresponding elements of the vector r as radices. Thus, m modulo operations will be performed.

According to one aspect of the invention, the value of the integer parameter m will be equal to the dimensionality of the array, n.

According to another aspect of the invention, the value of the integer parameter m will be unity, and the integer matrix $M_1$ will in this case also be equal to unity.

If a MOM is used, the physical memory used to store the live data (e.g., buffer, cache, SPM, etc.) is of size s, which is defined to be the product of the elements of the vector r. This is the case, since for an MOM ($M_2$ a mod r) is an integer vector whose value is contained in a rectangle whose extents are $r_1, r_2, \ldots, r_m$ and whose area is therefore equal to s. The matrix $M_1$ implements a simple linear-offset map of this vector into a one-dimensional offset that ranges between zero and s−1. Note that this embodiment of the invention uses a mapping of the form MOM, not the traditional linear-offset mappings of the form (LOM).

While there is a "naïve" way to determine legal parameters for an MOM, except in special cases (to be discussed) it can yield poor results. (As used herein, the term "naïve" refers to a simple method for determining MOM parameters having limited application.) In particular, consider a linear-offset mapping with linear offset function obtained from a permutation of the array axes, such as the C or Fortran mappings. For each point in time, t, there is a set of array elements that are live at that time with known offsets under a given LOM. A simple approach to obtaining parameters of the mapping may include computing the difference between the largest offset live at time t and the smallest offset live at time t, the difference representing the live-extent at time t. Then let m be equal to unity. The parameter $r_1$ may be chosen equal to the maximum over all time of the live-extent. The parameter $M_2$ is then equal to the same linear function as in the LOM and $M_1$ is unity. This results in a valid MOM wherein s is never larger than the product of the array bounds, so that some savings in memory storage space results as compared to a LOM mapping. However, as will be shown below, this approach may lead to poor results compared to those achievable by a more sophisticated procedure given as follows.

The discussion that follows makes reference to the class of mathematical objects known as lattices. A lattice is a set of vectors (such a n-tuples of real numbers) that consists of all of the integer linear combinations of a basis set, which is a linearly independent set of vectors.

Every lattice determines a unit cell, and the volume of this unit cell is called the determinant of the lattice. If a basis set of the lattice is arranged as the columns of a matrix B then the determinant of the lattice will be equal to the determinant of the square matrix $B^T B$.

If B is a matrix with linearly independent columns then its columns form a lattice basis. We shall denote by lattice(B) the lattice for which the columns of B form a basis set.

Figure 3:
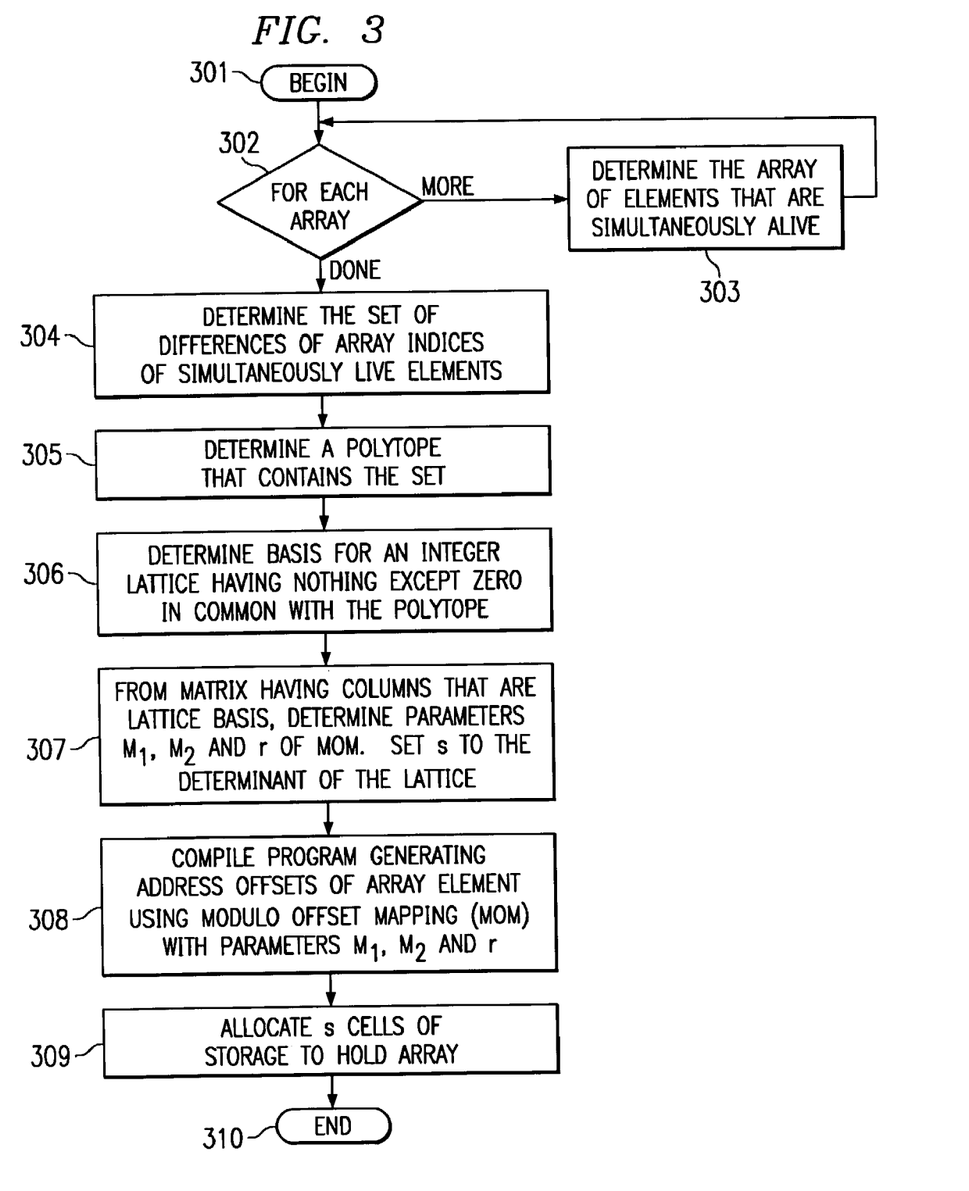
FIG. 3 is a flow chart of the steps performed when compiling source code according to one embodiment of the present invention.

Referring to the flow chart of FIG. 3, one embodiment of a method of optimizing memory usage begins at step 301. A loop is entered at step 302 to process each array defined and/or used by a particular segment of program instructions. At step 303 for each array to be minimized, array elements that are simultaneously live are determined. Step 304 determines a set of differences of array indices of simultaneously live elements. It is permissible to here determine a set that contains as a subset the set of differences of array indices of simultaneously live elements. At step 305 a polytope containing the set of differences may be determined. From this polytope, a basis for an integer lattice that has no vector other than the zero vector in common with said polytope is determined at step 306. In other implementations, the integer lattice determined at step 306 may be determined without reference to a polytope as optionally determined at step 305 but rather by the direct use of the set of differences determined at step 304. The amount of storage (s) required by the mapping will be equal to the determinant of this lattice. Step 307 determines the parameters $M_1$ and $M_2$ and r of the mapping from the matrix whose columns are the lattice basis. Compilation of the program source code into machine (or object) code may be implemented according to step 308 so as to generate the address of the array element whose array indices are a. These addresses are generated by using the formula (MOM) with the parameters $M_1$ and $M_2$ and r determined in step 307. At step 309 an allocation is performed of only s cells of storage to hold this array, where s is computed as the product of the elements of r, which is equal to the determinant of the lattice chosen at step 306; this value fully accommodating the range of offsets. Processing then terminates at step 310.

Because two elements that are simultaneously live at any point in time cannot be mapped to the same memory cell, any two array elements with array indices $a_1$ and $a_2$ that are simultaneously live must map to different addresses. Thus, let CS be the set of pairs $(a_1, a_2)$ of simultaneously live elements. By definition, CS is a symmetric relation: $(a_1, a_2)$ is in CS if and only if $(a_2, a_1)$ is too. DCS is the set of differences of elements in CS:

DCS=$\{x|x=a_1-a_2, (a_1, a_2)$ in CS$\}$. Because of the symmetry of CS, DCS is symmetric with respect to zero, that is, if d is in DCS than so is −d.

Figure 4:
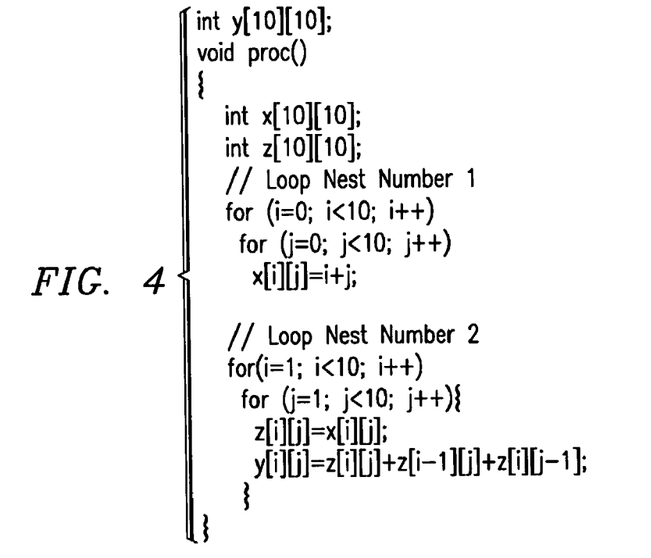
FIG. 4 is a diagram of an address space occupied by an input array defined by the set of vertices listed according to one embodiment of the present invention.

For example, given the program shown in FIG. 4, assume that it is desirable to implement this program using 10 parallel processing elements for nest 1 and nest 2 forming a pipeline and that iterations of loop nest 1 are scheduled so that the execution time of iteration (i, j) of this nest is time1 (i, j)=i+j. The iterations of loop nest 2 are scheduled such that time 2 (i, j)=i+j+1. Then, it follows that element a=(i, j) of array x is written at time (i+j) and read at time (i+j+1) thereby defining its lifetime. Thus, elements (i, j) and (i', j') are simultaneously live if and only if:

$$|(i+j)-(i'+j')|<=1 \qquad (1)$$

This inequality, together with the array bounds $$0<=i, i'<=9, 0<=j, j'<=9 \qquad (2)$$

defines the set CS of pairs of array index vectors that conflict. Note that the set DCS is a set of 2-dimensional vectors. By observing that (1) is the same as $$|(i-i')+(j-j')|<=1 \qquad (3)$$

it follows that DCS, in this case, consists of the set of 2-dimensional vectors $d=(d_i, d_j)$ for which $$-1<=(d_i+d_j)<=1 \qquad (4)$$

and $$-9<=d_i<=9, -9<=d_j<=9 \qquad (5)$$

Note that each array in the program has its own CS relation and DCS set. Also note that, if the read time or the write times for an array are unknown, then its CS relation would include all pairs of array indices that individually satisfy the array bounds. In this case the DCS set would consist of the set of all differences of array indices, defined by upper and lower bounds such as those of expression (5) above.

Sets (such as the ones defined in the example) that consist of all vectors that satisfy a system of inequalities on affine functions of the elements of the vectors are known as polyhedra, and if the sets are bounded then they are called polytopes. For example, every polygon in two dimensions is a polytope.

Initially, it may be assumed that DCS is a polytope. If it is not, it can be replaced with any polytope that contains it. (Note that since the array index a is bounded by the array bounds, DCS is likewise bounded and can be enclosed in a polytope.)

The following discussion describes one possible method for determining the parameters $M_1$ and $M_2$ and r of an MOM.

Referring back to step 306 of FIG. 3, an integer lattice is formed as follows. Given a zero-symmetric polytope SymPol, there is a heuristic algorithm to find an Ordered Rectangular Bounding Lattice (ORBL) with basis B, which is a lattice that has the following special properties:

1. lattice(B) and SymPol have only the origin (the zero vector) in common.

2. The basis set $B=\{b_1, b_2, \ldots, b_n\}$ consists of multiples of the standard basis—it is a rectangular lattice. Thus, lattice(B) consists of all vectors of the form ($R_1*y_1$, $R_2*y_2, \ldots, R_n*y_n$) where $R_1, R_2 \ldots, R_n$ are given integers and $y_1, y_2, \ldots$, are arbitrary integers.

3. Up to a permutation of the axes, the basis B of L has the properties:

3.a. $b_1=R_1*e_1$ where $e_1=(1, 0, \ldots, 0)$ is the first element of the standard basis, and $R_1$ is a positive integer.

3.b For all $x=(x_1, x_2, \ldots, x_n)$ in SymPol, $R_1>|x_1|$. That is, all of SymPol is contained in the strip satisfying $-R_1<x_1<R_1$ 3.c Properties 3.a and 3.b apply also to $b_2, \ldots b_n$ and the n-1 dimensional polytope given by the intersection of SymPol with the hyperplane $\{x|x_1=0\}$.

This proof is constructive—that is, it is a process for constructing the ORBL called the successive tightest interval algorithm for an ORBL for SymPol. In other words, one first finds $R_1$ as the smallest integer larger than the $x_1$ component of any element of SymPol. One then constructs the remaining elements of B by a recursive call using the projection of SymPol onto the hyperplane $\{x|x_1=0\}$. It can be demonstrated that properties 2 and 3 trivially hold. Property 1 also holds true, as follows:

Let L be any lattice for which 2 and 3 hold.

Let x be an element of SymPol. It cannot be in the lattice unless $x_1=0$, since SymPol satisfies property 3.b. Thus, $x_1$ must be zero.

Proceed recursively to show that $x_2, x_3$, etc. are also zero. Therefore, L and SymPol have only the zero vector in common, which is what we sought to prove.

For these reasons, for any permutation of the axes, an ORBL may be found by using a successive tightest interval algorithm. Further, an ORBL may be found by examining all of the possible permutations and using the successive tightest interval algorithm described above. It is then only advantageous to select the permutation that leads to the ORBL with the smallest determinant.

It is further noted that, if two array indices a and a' have overlapping lifetimes (so that (a-a') is in the DCS) and $R=(R_1, R_2, \ldots, R_n)$ then a mod R is not equal to a' mod R, or equivalently (a-a') mod R is not equal to zero unless a is equal to a'.

Refering to step 307, $M_1$ and $M_2$ and r may be determined from the ORBL, which can be used to minimize memory requirements. In particular, the ORBL is defined by an ordering of the n dimensions, and an n-dimensional vector R.

Let m=1. Let $r=(r_1)$ where $r_1=prod(R)$. (This is the number of memory cells that will be used.)

Assuming that the permutation of the axes or the ORBL is (1, 2, . . . , n), the following relationship is applied:

linear_offset$(a)=(a_1+R_1*(a_2+R_2*(a_3 \ldots ) \ldots)$
mod r such that the parameter $M_2$ is given by the formula $M_2=(1, R_1, R_1*R_2, \ldots, R_1*R_2* \ldots *R_{(n-1)})$.

If the permutation is $p_1, p_2, \ldots, p_n$ rather than 1, 2, . . . , n, then: $M_2(p_1)=1$; $M_2(p_2)=R(p_1)$; $M_2(p_3)=R(p_2)*M_2(p_1)$; etc.

To complete this particular method of obtaining the parameters of the MOM, the parameter $M_1$ is the integer 1.

This completes Step 307, the process of going from the ORBL to the three parameters $M_1$ and $M_2$ and r of the mapping used in Step 308.

Note that the ORBL method generally provides improved results over the naive method detailed initially. Take the example given above. There are two choices for an LOM, either Fortran or C style. In either case, the maximum live extent is 89. Using LOM alone, 100 memory locations are required. Using an MOM generated by using the "naïve" method of finding the parameters by using the extents of the set of live elements in the LOM-generated address space, only 89 memory locations are required. However, using the ORBL results in the identification of a lattice of determinant 20 and this is the number of memory cells that are needed with this method. Since at time 10 there are 19 live array elements, 20 is within one of being a best-possible minimization of memory requirements.

Using this method according to the inventions results in a superior mapping of the form (MOM) usable as an alternative to the standard mappings of the form (LOM). The method exploits a known schedule of accesses (reads and writes) to the elements of an array. By the use of the class of mappings (MOM) according to a method of the invention to determine the parameters of the mapping, it becomes possible to use many fewer memory cells to store an array than with either of other methods, including linear-offset.

Figure 5:
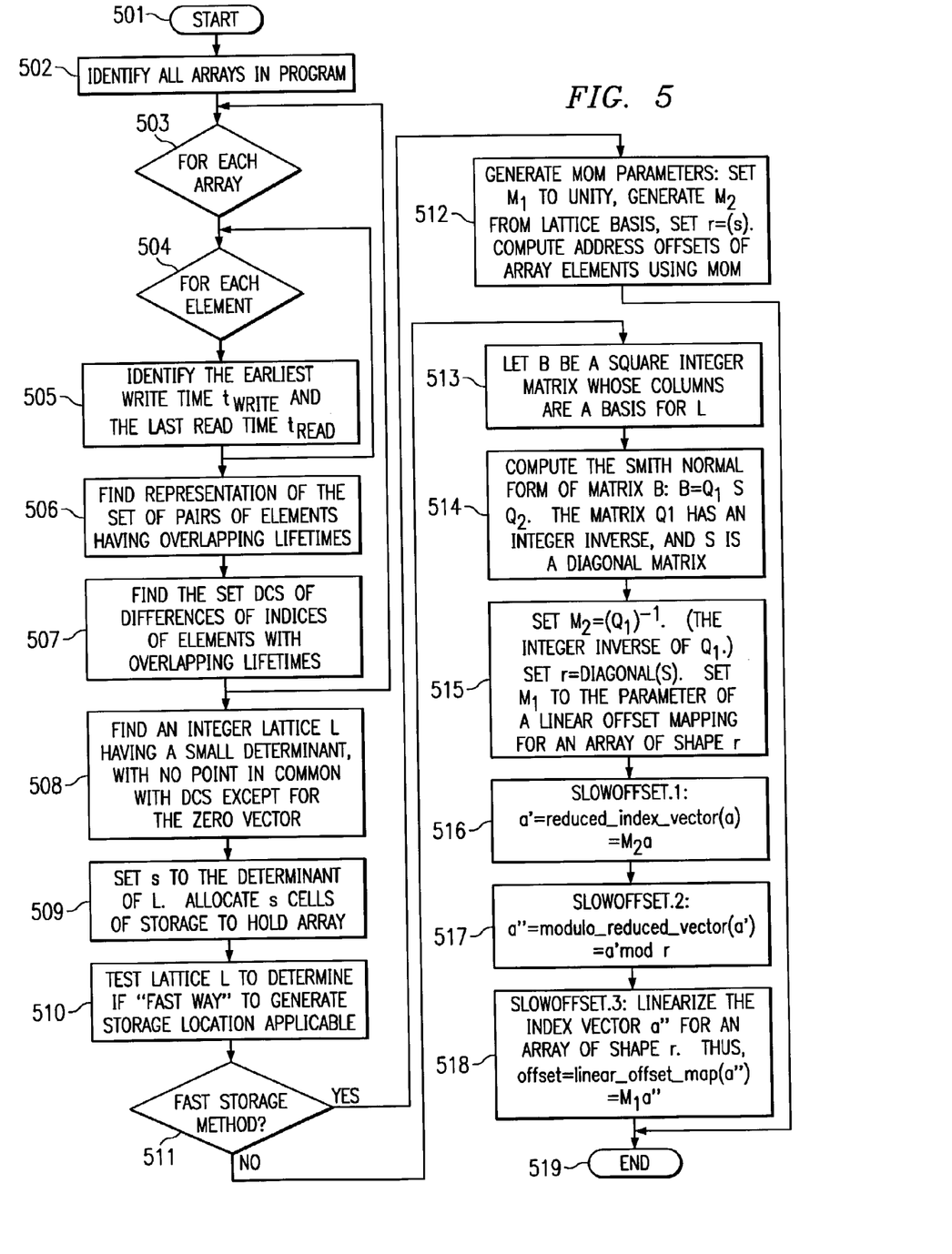
FIG. 5 is a flow chart of a method according to an embodiment of the invention for identifying data storage resources required during portions of a program and storing the live subset of data in a buffer or scratch pad memory for ready access by a data consumer such as a processor.

FIG. 5 is used to illustrate another embodiment of a method according to the invention. Referring to the figure, the method begins at step 501 and at step 502 all arrays in the program of interest are identified. Steps 503 and 504 examine each such array and each element of each array, to find the times at which each is written and the times at which it is read at step 505. Note that alternative methods may also be used so as to determine, for any two elements of the array, whether or not they are "live" at the same time. For purposes of illustration, assume that a program uses an array A which is declared by the statement int A[100][100];

Thus, A consists of 10,000 elements, each of which is an int[eger type].

The elements of array A are each written at known times. In particular, Element A[i][L] is written at time i+j. Before then it has no known, meaningful contents. Likewise, the elements are read at known times: Element A[i][j] is read at time i+j+1. After that time, its contents are irrelevant. So, for example, element A[2][3] is written at time (clock cycle) 5 and read at time 6. The time from 5 to 6 is the lifetime of this element. Element A[2][4] has lifetime from 6 to 7, and element A[2][5] has lifetime from 7 to 8.

Note that when two elements have nonoverlapping (or disjoint) lifetimes, they can share the same physical storage location.

At step 506, for each such array, a representation is found of the set of pairs of elements that have overlapping lifetimes. This is called set CS (the Conflict Set), identifying the set of elements that cannot share storage. In the present example, $A[i_1][j_1]$ and $A[i_2][j_2]$ have overlapping lifetimes if the difference between $(i_1+j_1)$ and $(i_2+j_2)$ is zero or one or minus one. Otherwise these elements have disjoint lifetimes. According to one embodiment of the invention, this set may be represented using a system of linear inequalities involving the indices of the elements.

Figure 6:
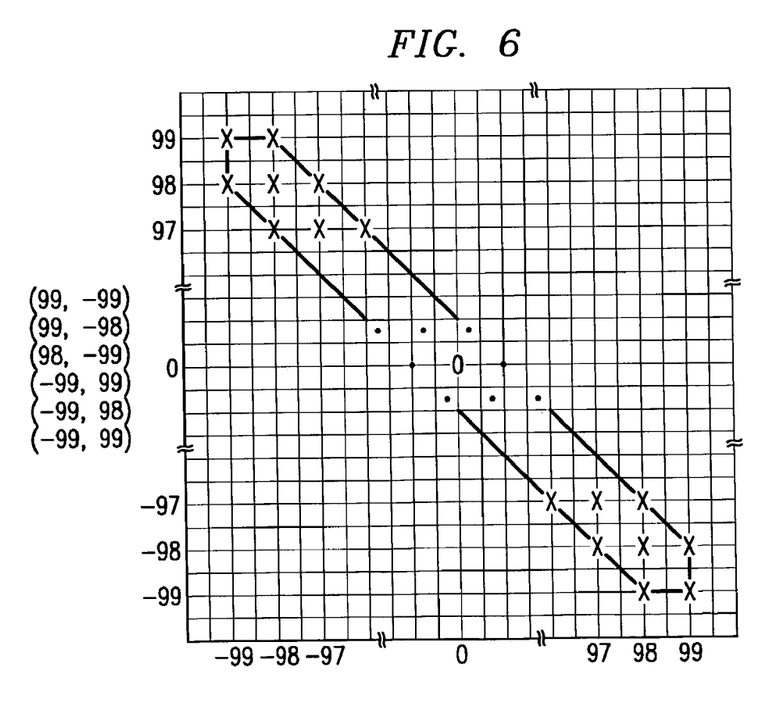
FIG. 6 is an example of program source code for implementing a program according to one embodiment of the present invention.

Step 507 finds the set of differences of indices of elements with overlapping lifetimes which is called set DCS. In other words, if the pair of index vectors (a, b) is in CS, then their difference, which is the vector d=(a−b) is in DCS, as is −d=(b−a). In the present example, DCS is the set of integer vectors lying in a polygon in the plane. Referring to FIG. 6, given the set of six vertices listed on the left side of the figure, the resultant polygon is shown by the graph at the right of the figure. According to one embodiment of the invention, DCS may be represented as a polytope (an n-dimensional polygon) defined by a set of linear inequalities. According to another embodiment of the invention, a polytope that contains DCS as a subset may be used in place of DCS.

Step 508 finds an integer lattice that has a small determinant, but that does not have any point in common with the set DCS except for the zero vector. This lattice is called L and may be represented by a square n×n integer matrix B having columns that are a basis for the lattice. The dimension of the array is given by n, which, in the present example is equal to 2. Thus, L may be taken to be the lattice with basis $$B = \begin{bmatrix} 100 & 0 \\ 0 & 2 \end{bmatrix}$$

which is a lattice with determinant 200.

An amount of physical memory equal to the determinant s of the lattice L will be used to store the elements of the array, with no two elements sharing storage if their lifetimes overlap. At Step 509 the determinant of L is calculated and a number of storage cells is allocated based on the calculated determinant.

As previously described, there is a Special and Less Costly method to generate storage locations that works by constructing an ORBL with small determinant. There is also a General but More Costly method that is more efficient in that it can produce a greater reduction in the amount of memory needed to store the live elements of an array. That is, the first, simple method works only for some lattices, those that have the structure of an ORBL, while the General but More Costly method works no matter what lattice is selected at step 508, so long as it has no point other than zero in common with the set DCS. Thus, at step 510, the lattice is tested to see if the fast Special method to generate storage locations may be utilized. If so, processing continues at step 512. In particular, this simplified method works when the basis of the lattice forms a diagonal matrix, like the matrix B of the example, and furthermore, the first element on the diagonal is bigger than the first ($d_1$) coordinate of any element of the DCS, the second element is bigger than any element of the part of the DCS found along the line defined by ($d_1$=0), and so on.

At Step 512, the MOM parameters are determined for the Special method. The integer m is one, the matrix $M_1$ is also equal to one, the vector r has one element, namely s (the lattice determinant) computed at step 509, and the matrix $M_2$ is computed from the lattice basis.

The lattice whose basis is the matrix B permits the use of the Special method. In this simple case, array element A[i][j] is stored at storage location offset=(i+100j) mod 200 in a one-dimensional memory array of size 200. In the n-dimensional case, the array index vector is denoted $a=(a_1, a_2, \ldots, a_n)$, such that:

FastOffset($a$)=$M_2$ a mod $r=a_1+R_1*(a_2+R_2*(a_3+ \ldots R_{(n-1)}a_n) \ldots)$ mod $s$ where the diagonal elements of the basis matrix B are $R_1, R_2, \ldots, R_n$, and s is the determinant of the lattice, which is equal to the product of $R_1, R_2, \ldots$, through $R_n$.

If the simple approach of step 512 cannot be used, then a more general approach provided by steps 513-518 may be utilized. This more general method for finding the storage location works no matter what lattice has been have chosen, again so long as the lattice has nothing in common with the set DCS other than zero.

Referring to step 513, given a basis for the lattice in the form of an n×n matrix B, the parameters of an MOM (these parameters comprising an integer m, a matrix $M_1$, a matrix $M_2$ and a vector r) are found, and the storage offset assigned to the array element with index vector is computed by the MOM with these parameters. The parameters are found according to the following steps:

Step 514: To find $M_2$ and r, the Smith Normal Form (see A. J. Shrijver, Theory of Linear and Integer Programming, John Wiley and Sons, 1986, incorporated herein in its entirety by reference) of matrix B is computed. The Smith Normal Form of the matrix B is a factorization of B, as follows:

B=$Q_1SQ_2$ where S is a diagonal matrix, and $Q_1$ and $Q2$ are integer matrices that have integer inverses.

Step 515: The matrix $M_2$ is obtained by computing the inverse of $Q_1$. The vector r is given by the diagonal elements of S. The matrix $M_1$ is determined via linearization of an array whose shape is given by r.

The program is then compiled, using the modulo-offset mapping (MOM) formula with integer m equal to n, as shown in Steps 516-518.

Step 516: SlowOffset.1 a'=reduced_index_vector(a)=$M_2$a. (That is, the matrix $M_2$ is multiplied by the vector a to yield the vector a'.)

Step 517: SlowOffset.2 a''=modulo_reduced_vector (a')=a' mod r.

(That is, take each element of a' modulo the corresponding element of r to get the corresponding element of a''.)

Step 518: SlowOffset.3 Linearize the index vector a'' in the standard manner for an array whose dimensions are given by r. In one possible way to do this, the offset is expressed as:

offset=$a''_1+r_1*(a''_2+r_2*(a''_3+ \ldots +r_{(n-1)}*a''_n) \ldots)$.

This method is slightly slower (with respect to the cost of computing the offset for a given array index vector a'' since we have to multiply a by $M_2$ and then do several modulo operations, whereas the Special fast method requires only one mod operation.

Note that this mapping in an MOM whose parameters $M_2$ and r are as stated above and whose parameter $M_1$ is the 1×n matrix (1, $r_1$, $r_1r_2$, ... $r_1r_2r_{(n-1)}$).

The process terminates at step 519.

What is claimed is:

1. A method of storing data comprising the steps of:
   identifying a multidimensional array data structure in a program, the array data structure having elements;
   finding a set of differences of indices of at least all pairs of said elements having overlapping lifetimes;
   finding an integer lattice with no non-zero vector point in common with said set of differences; and
   mapping from a data index space of said array data structure to an address offset space using said integer lattice.

2. The method according to claim 1 further comprising the steps of:
   compiling a program including generating an address offset of an array element of said array data structure having array index "a" using a formula M1(M2 a mod r)

where M1 is a 1×m integer matrix, M2 is an m×n integer matrix, and r is an m element column vector.

3. The method according to claim 2 further comprising the step of allocating a number of cells equal to a product of the entries in r and used to store said array element of said array data structure.

4. The method according to claim 2 further comprising the restriction that the matrix M2 have one row, the vector r have one element, and the matrix M1 be equal to unity.

5. The method according to claim 2 wherein the matrix M1 is equal to one, the matrix M2 is a 1×n integer matrix, the vector r has one element being a determinant of the lattice and M2 is computed from a basis of the lattice, wherein an array index vector for the array "a" is denoted $a=(a_1, a_2, \ldots, a_n)$ and $$M2\ a \bmod r = a_1 + R_1^*(a_2 + R_2^*(a_3 + \ldots + R_{(n-1)}a_n) \bmod s$$

where diagonal elements of a basis of the lattice are $R_1, R_2, \ldots, R_n$ and s is a determinant of the lattice, which is equal to the product of $R_1, R_2, \ldots, R_n$.

6. The method according to claim 2 wherein a basis of the lattice is an n×n matrix B and further comprising:
  obtaining a Smith Normal Form of the matrix B of the form $B=Q_1SQ_2$ where S is a diagonal matrix, and $Q_1$ and $Q_2$ are integer matrices that have integer inverses;
  obtaining the matrix M2 by computing the inverse of $Q_1$;
  obtaining the vector r from diagonal elements of S; and
  determining the matrix M1 from linearization of an array whose shape is given by r.

7. The method according to claim 1 further comprising a step of finding an integer lattice including attempting to minimize a determinant of said integer lattice.

8. The method according to claim 1 further comprising a step of generating computer executable instruction code for storing said data elements into memory locations corresponding to said address offset space.

9. The method according to claim 1 further comprising a step of translating an index of an element of said array data structure to an address offset space including a step of performing modulo arithmetic.

10. The method according to claim 9 wherein said step of mapping includes translating from a multidimensional data index space to a smaller address offset space using a linear-offset mapping followed by a single modulo operation.

11. The method according to claim 9 wherein said step of mapping includes translating from a multidimensional data index space to a smaller address offset space using a linear mapping to a second data index space, followed by multiple modulo operations applied to an index in said second data index space, followed by a linear-offset mapping to an address offset space.

12. The method according to claim 1 further comprising determining whether the lattice is an ordered rectangular bounding lattice.

13. A computer program stored in a computer readable medium, said computer program comprising computer executable code for:
  identifying a multidimensional array data structure in a program, the array data structure having elements;
  finding a set of differences of indices of at least all pairs of said elements having overlapping lifetimes;
  finding an integer lattice with no non-zero vector point in common with said set of differences; and
  mapping from a data index space of said array data structure to an address offset space using said integer lattice.

14. The computer program according to claim 13 further comprising computer executable code for:
  compiling a program including generating an address offset of an array element of said array data structure having array index "a" using a formula $$M1(M2\ a \bmod r)$$

where M1 is a 1×m integer matrix, M2 is an m×n integer matrix, and r is an m element column vector.

15. The computer program according to claim 14 further comprising computer executable code for allocating a number of cells equal to a product of the entries in r and used to store said array element of said array data structure.

16. The computer program according to claim 14 wherein said computer executable code allocating a number of cells implements a restriction that the matrix M2 have one row, the vector r have one element, and the matrix M1 be equal to unity.

17. The computer program according to claim 14 wherein the matrix M1 is equal to one, the matrix M2 is a 1×n integer matrix, the vector r has one element being a determinant of the lattice and M2 is computed from a basis of the lattice, wherein an array index vector for the array "a" is denoted $a=(a_1, a_2, \ldots, a_n)$ and, $$M2\ a \bmod r = a_1 + R_1^*(a_2 + R_2^*(a_3 + \ldots + R_{(n-1)}a_n) \bmod s$$

where diagonal elements of a basis of the lattice are $R_1, R_2, \ldots, R_n$ and s is a determinant of the lattice, which is equal to the product of $R_1, R_2, \ldots, R_n$.

18. The computer program according to claim 14 wherein a basis of the lattice is an n×n matrix B and further comprising:
  obtaining a Smith Normal Form of the matrix B of the form $B=Q_1SQ_2$ where S is a diagonal matrix, and $Q_1$ and $Q_2$ are integer matrices that have integer inverses;
  obtaining the matrix M2 by computing the inverse of $Q_1$;
  obtaining the vector r from diagonal elements of S; and
  determining the matrix M1 from linearization of an array whose shape is given by r.

19. The computer program according to claim 13 further comprising computer executable code for finding an integer lattice including attempting to minimize a determinant of said integer lattice.

20. The computer program according to claim 13 further comprising computer executable code for generating computer executable instruction code for storing said data elements into memory locations corresponding to said address offset space.

21. The computer program according to claim 13 further comprising computer executable code for translating an index of an element of said array data structure to an address offset space including a step of performing modulo arithmetic.

22. The computer program according to claim 21 wherein said step of mapping includes translating from a multidimensional data index space to a smaller address offset space using a linear-offset mapping followed by a single modulo operation.

23. The computer program according to claim 21 wherein said step of mapping includes translating from a multidimensional data index space to a smaller address offset space using a linear mapping to a second data index space, followed by multiple modulo operations applied to an index in said second data index space, followed by a linear-offset mapping to an address offset space.

24. The computer program according to claim 13 further comprising computer code for determining whether the lattice is an ordered rectangular bounding lattice.

* * * * *

UNITED STATES PATENT AND TRADEMARK OFFICE
CERTIFICATE OF CORRECTION

| | | |
|---|---|---|
| PATENT NO. | : 7,363,459 B2 | Page 1 of 1 |
| APPLICATION NO. | : 10/284844 | |
| DATED | : April 22, 2008 | |
| INVENTOR(S) | : Robert S. Schreiber et al. | |

It is certified that error appears in the above-identified patent and that said Letters Patent is hereby corrected as shown below:

On the title page, in field (75), in "inventors", in column 1, line 2, delete "Lyons" and insert -- Lyon --, therefor.

Signed and Sealed this

Twenty-sixth Day of August, 2008

JON W. DUDAS
*Director of the United States Patent and Trademark Office*